(12) United States Patent
Yeh

(10) Patent No.: US 6,281,620 B1
(45) Date of Patent: Aug. 28, 2001

(54) LAMP WITH IR REFLECTIVITY

(76) Inventor: Naiguang Yeh, Jida Sewage Treatment Plant, Zhuhai, Guangdong, P.R. (CN)

( * ) Notice: Subject to any disclaimer, the term of this patent is extended or adjusted under 35 U.S.C. 154(b) by 0 days.

(21) Appl. No.: 09/158,033

(22) Filed: Sep. 22, 1998

(30) Foreign Application Priority Data

Sep. 26, 1997 (CN) .............................. 97 1 17031

(51) Int. Cl.$^7$ .................................................. H01J 5/16
(52) U.S. Cl. ......................... 313/113; 313/573; 362/256
(58) Field of Search ................................... 313/113, 112, 313/573, 580; 362/255, 256, 311

(56) References Cited

U.S. PATENT DOCUMENTS

| | | | |
|---|---|---|---|
| 4,180,755 | * 12/1979 | Nixon, Jr. ............................ | 313/113 |
| 4,916,353 | * 4/1990 | Danko et al. ........................ | 313/113 |
| 5,548,182 | * 8/1996 | Bunk et al. .......................... | 313/113 |
| 5,660,462 | * 8/1997 | Bockley et al. ..................... | 313/113 |

* cited by examiner

Primary Examiner—Nimeshkumar D. Patel
Assistant Examiner—Todd Reed Hopper
(74) Attorney, Agent, or Firm—Kajane McManus

(57) ABSTRACT

The lamp includes a cap engaged to a bulb composed of a glass lens and a glass reflector, the lens and reflector each having an inner surface which is parabolically shaped and coated with an IR reflective material layer. The interior configuration of elements of the lamp is mathematically molded to cause infrared rays emitted by the filament to evenly reflect back to the filament heating same and thereby increasing lighting efficiency up to 50%, with the lamp emitting cool light and without compromising longevity of the lamp. The lamp may be any of a plurality of diversified types, such as high pressure sodium, metal halide, incandescent, halogen, etc.

17 Claims, 2 Drawing Sheets

LAMP WITH IR REFLECTIVITY

BACKGROUND OF THE INVENTION

1. Field of the Invention

The present invention relates to a lamp which has improved efficiency. More specifically, a bulb of the lamp is configured to incorporate parabolic inner surfaces which are coated with an IR reflecting material to reflect emitted infrared rays back to a filament of the lamp, thereby increasing the lighting coefficient of the lamp, and, inherently, its efficiency.

2. Prior Art

Generally, the efficiency of incandescent lamps is less than 15%, with infrared (IR) radiation comprising over 85% of the radiant energy thereof. Even more efficient high-pressure sodium, metal halide and xenon lamps still emit 20%–30% of their total radiant energy as IR. Further, the filaments of lamps and the rods of, and an arc produced by, an arc lamp are usually linear, with such linearity creating a key problem in manufacturing lamps with a proper geometric shape for IR reflection. The substantial degree of IR radiation emitted by the above mentioned lamps not only increases costs for lighting due to inefficiency, but also pollutes our environment.

In the early 1980's, it was determined that IR reflecting material layers coated on an interior bulb surface are able to reflect IR radiation emitted from a filament, back to the filament, heating same and greatly increasing the lighting coefficient of the lamp. The reflecting material layers used in early units, however, could only accommodate temperatures up to 500° C., leading to the development of crystalline substances for use in creating a high temperature filament, typically having the form of a dot.

Next, it was proposed to curve a filament to a plane and to position the filament at the center of a spherical bulb, with a dot to dot symmetry about a center point, making it possible to coat an IR reflecting material layer onto the inner surface of the bulb. However, much of the emitted IR radiation is still not reflected to the filament, inasmuch as a spherical lamp bulb produces non-symmetric reflection, when viewed in light of optical geometry.

To further improve lighting efficiency, a type of halogen tungsten filament incandescent lamp incorporating an IR reflecting material layer has been developed in some countries. In a lamp of this type, a filament is positioned along a major axis of an elliptical bulb, the outer surface of which is coated with an IR reflecting material layer. However, lamps of this type have a decreased useful life because two reflective foci around which IR rays are concentrated are inherently produced, forming two hot spots on the filament. Simultaneously, the many IR rays generated near each of the two ends of the filament cannot be reflected back to the filament. Even spherical or cylindrical bulb embodiments of such lamps still do not afford higher efficiency.

SUMMARY OF THE INVENTION

Accordingly, it is a primary object of the invention to provide a lamp providing a high degree of energy savings and incorporating a bulb of a double parabolic configuration, a parabolic lens thereof being coated with an IR reflecting material layer on an inner surface thereof and a reflector thereof being coated with aluminum on an inner surface thereof to reflect, with a high degree of coincidence, substantially all IR rays emitted by a linear filament thereof back to the filament to heat same, thereby improving lighting efficiency of lamps of the incandescent, halogen and arc type and significantly increasing the useful life of the bulb.

DESCRIPTION OF THE PREFERRED EMBODIMENT

Figure 1:
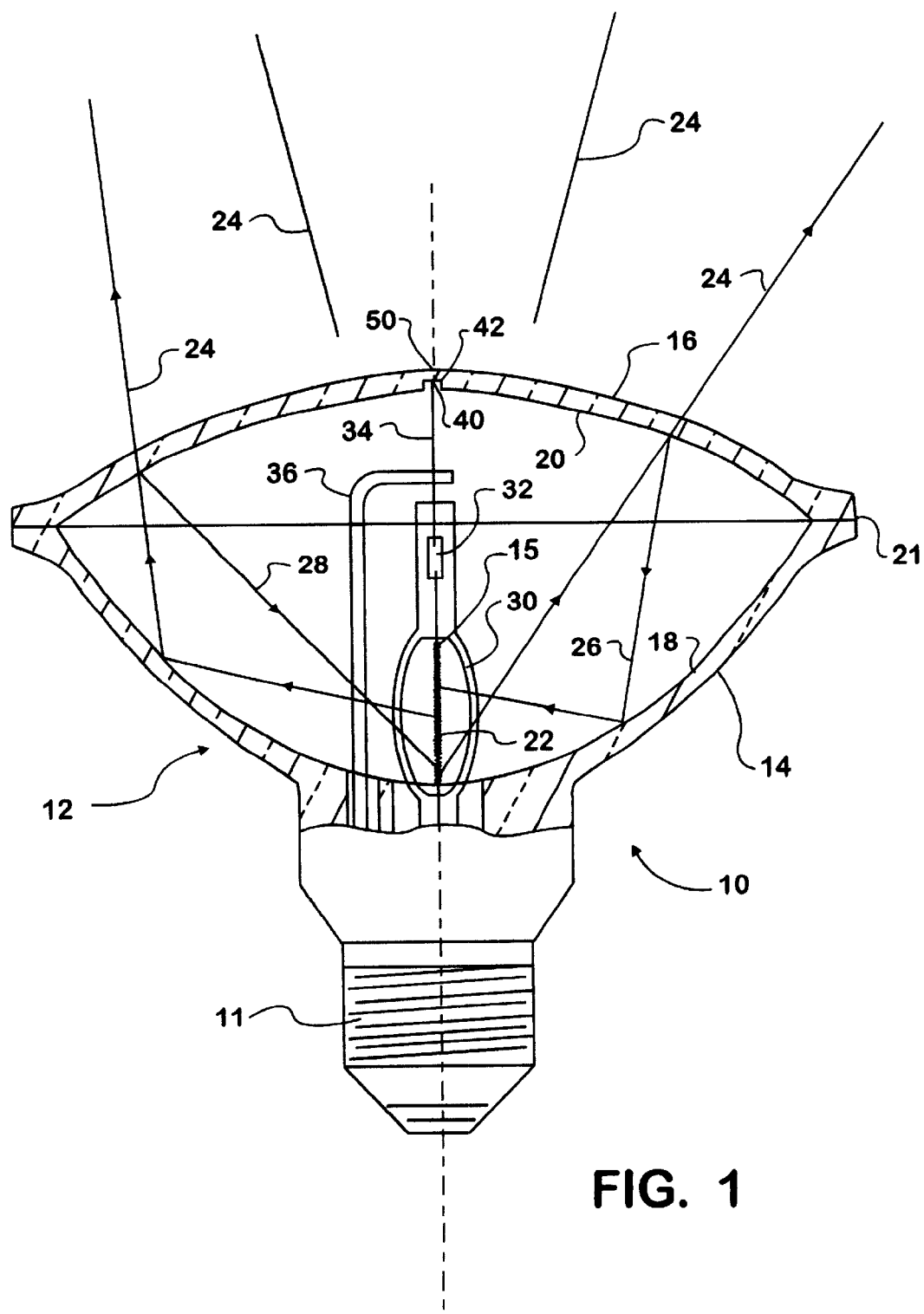
FIG. 1 is a perspective view of a lamp made in accordance with the teachings of the present invention, with portions of a bulb thereof broken away to show internal elements of the bulb.

Referring now to the drawing in greater detail, there is illustrated therein a lamp made in accordance with the teachings of the present invention and generally identified by the reference numeral 10. The lamp 10 includes a cap 11 suitably engaged to bulb 12 incorporating a glass reflector 14 and glass lens 16. An inner surface 18 of the glass reflector 14 and an inner surface 20 of the glass lens 16 are both parabolic in shape, the lens 16 and reflector 14 being specially processed via known molding, fusion, pinching, and sealing technologies under high pressure to create the bulb 12. The inner surface 20 of the lens 16 is coated with a layer of IR reflecting material such as $TiO$—$SiO_2$, $Ta_2O_5$—$SiO_2$, while the inner surface 18 of the reflector 14 is coated with a layer of aluminum, silver, or an IR reflecting material, as defined above.

Inasmuch as the teachings herein are considered equally applicable for use in lamps 10 incorporating a linear filament 22, as well as in arc lamps (FIG. 2), the term filament 22 will be used herein as symbolizing all embodiments for the sake of brevity. During design of the lamp 10, through mathematical modeling, a focal distance $f_2$ for the lens 16 and a focal distance $f_1$ for the reflector 14 must be calculated, relative to a length of the linear filament 22, to provide coincidence between the lens 16 focus $f_2$ and the reflector 14 focus $f_1$ after the reflector 14 and lens 16 have been joined together about a peripheral area 21. The lines of IR reflection 26 and 28 were obtained by theoretical calculation and experimental tracing of such rays while all visible light rays as indicated at 24 are transmitted outwardly of the lamp 10, through the lens 16. The area of the inner parabolic surface 18 of the reflector 14 can be calculated from the following equation:

$$y_1^2 = (r^2/b_1)X,$$

where:

$Y_1$ = Y coordinate axis of reflector parabolic plane
r = radius of parabolic reflector
$b_1$ = height of reflector parabolic plane
X = X coordinate axis of reflector parabolic plane The area of the inner parabolic surface 20 of the lens 16 is also calculated from $$y_2^2 (r^2/b_2)X,$$

where:

$Y_2$ = Y coordinate axis of lens parabolic plane
r = radius of parabolic lens
$b_2$ = height of lens parabolic plane
X = X coordinate axis of lens parabolic plane It will be understood that the filament 22 is maintained vertical by engagement thereof across a support 30, along which a metal weld plate 32 is provided across which the filament 22 is electrically coupled to a conductor 34.

The conductor 34 is further engaged by a joint support 36 which is welded to the cap 11.

It will be understood that the filament 22 lies along a center axis X of the bulb 12, extending from the lens 16 to the reflector 14, with a free end 40 of the conductor 34 engaging within a positioning dimple 42 created in the inner surface 20 of the lens 16, at a centered position, along the axis X, assuring linear alignment of the conductor 34 and filament 22 along the center axis X of the bulb 12.

A double ended high pressure sodium (HPS) lamp 10 made in accordance with the teachings of the present invention was comparison tested against an identical lamp without IR reflectivity, by the Electric Light Sources Institute of Fundan University, Peoples Republic of China, with the following result:

| HPS Lamp with IR reflector | | | HPS Lamp without IR Reflector | | | |
|---|---|---|---|---|---|---|
| Voltage (V.) | Wattage (W.) | Signal tested (value gained) | Voltage (V.) | Wattage (W.) | Signal tested (value gained) | Efficiency Improved (%) |
| 220 | 70 | 263 | 220 | 70 | 230 | 14.35% |

From the result of such testing, it will be seen that efficiency has been improved approximately 15% through use of the teachings herein.

Also, theoretical calculations have illustrated that lighting efficiency of double ended incandescent lamps and halogen lamps could be increased by as much as 50% if the teachings herein were to be applied thereto. Further, in newly developed HPS and LPS lamps, metal halide lamps, xenon lamps, etc., a bulb 12 coated with an IR reflecting material layer on an inner surface thereof promises bright prospects due to advantages such as a sufficient distance between the filament 22 and the reflector 14 surface 18, controlled temperature of under 500° C., and impossibility of peeling of the IR material layers.

The invention has wide usage applications, such as in home lighting, commercial lighting, highway lighting, etc. Also, due to coolness of the lighting produced by the lamp 10, it could be substituted for existing hot burning light sources, providing capability for creating cool burning lamps of different power, voltage and dimensions.

Considering a halogen lamp as an example for realizing this capability, the following are taken into account.

1) Design and calculation of reflector's parabolic plane:

The halogen lamp 10 is molded of hard glass and the inner surface 18 of the reflector 14 is parabolic in shape and coated with an aluminum material layer. A halogen lamp requiring a 120V source and having a 100W tungsten filament with a length of 14 mm will be used for the example. It is known that the focal length $f_1$ of the reflector 14 should be slightly longer than the length of the filament 22, obtained by adding 2 mm+14 mm=16 mm. For example, if the diameter of the reflector's 14 parabolic plane is taken as 100 mm, by using the equation:

$$f_1 = r^2/4b_1$$

where $f_1$=focal length
r=radius of the reflector parabolic plane
$b_1$=height of the reflector parabolic plane we can manipulate the equation to determine $b_1$:

$$b_1 = r^2/4f_1 = (50)^2/(4 \times 16) = 39.0625 \text{ mm}.$$

Thus we obtain by using the parabolic plane equation:

$$Y_1^2 = ((r^2)X)/b_1 = ((50)^2 X)/39.0625 = 64X, \text{ i.e., } Y_1^2 = 64X.$$

We know that the filament of a halogen lamp 10 has two ends, one of which is mounted at focal point 15 and the other end of which is mounted near the bottom of the reflector's parabolic plane, on the axis X.

2) Design and calculation of lens's parabolic plane:

Being made from hard glass, the inner surface 20 of the lens 16 takes a parabolic shape with the inner surface 20 being coated with an IR reflecting material layer of $TiO_2$—$SiO_2$. It is known that a diameter of the lens 16 is equal to a diameter of the reflector 14; here 100 mm. Suppose that the height of the lens's parabolic plane, $b_2$=16 mm (focal length $f_1$ of the parabolic plane of the reflector 14), thus we obtain by using the equation:

$$f_2 = r^2/4b_2, \text{ where:}$$

$f_2$=lens 14 focal length $f_2$
$b_2$=height of the lens's parabolic plane so:
$f_2 = (50)^2/(4 \text{ mm} \times 16 \text{ mm}) = 39.0625$ mm and we obtain by using the equation of the lens's parabolic plane: $Y_2^2 = (r^2X)/b_2 = ((50)^2 X)/16 = 156.25X$. Total height of inner surface of the bulb B=eight of the lens $b_2$ plus height of parabolic plane of the reflector $b_1$=16+39.0625=55.0625 mm. Thus: $f_2$=total height of the bulb B−$f_1$=55.0625 minus 16=39.0625 mm (focal distance of the lens).

The above result indicates that the focus of lens 16 will be coincident with the focus of reflector 14 when they are suitably engaged about the periphery 21. The positioning dimple 42 is centered (positioned at a vertex 50 of lens 16) during molding to center the conductor 34 and thus the filament 22 continuing therefrom along the center axis X of the bulb 12, extending between the lens 16 and the reflector 14.

Spatial configuration parameters for an incandescent or arc lamp would be similarly calculated, as defined above.

Figure 2:
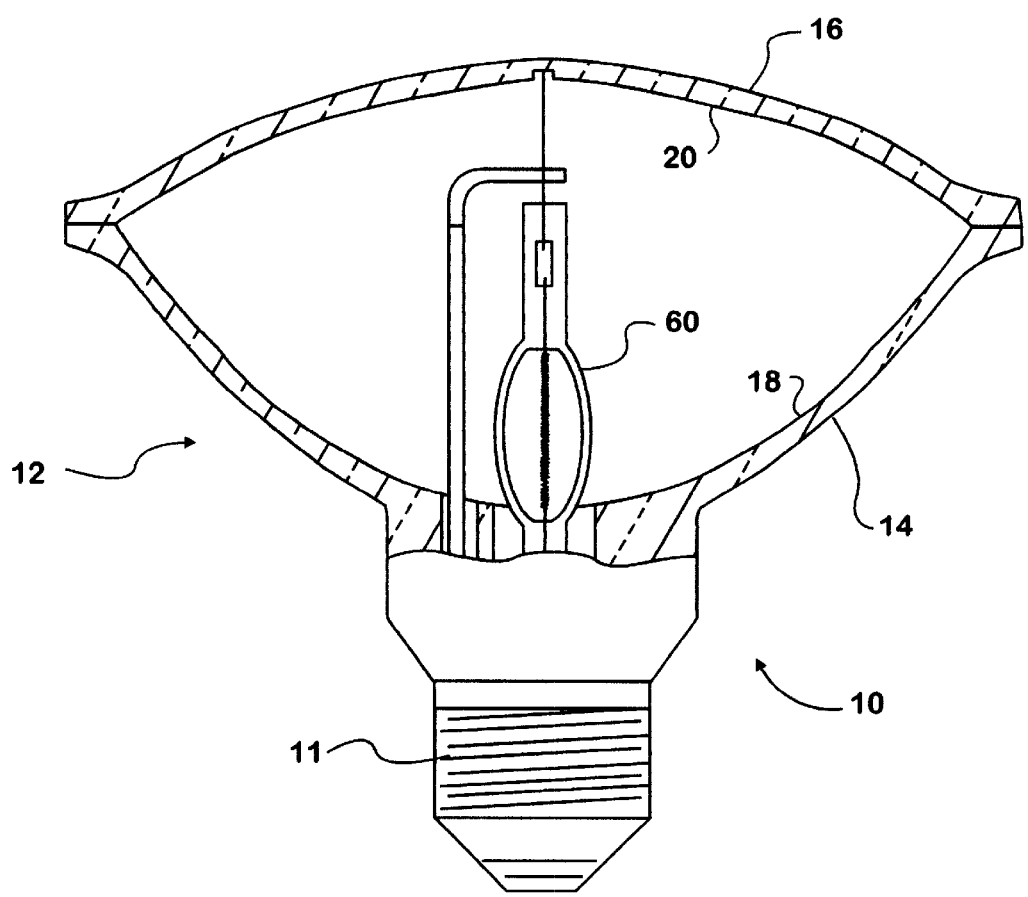
FIG. 2 is a perspective view of a lamp made in accordance with the teachings of the present invention, with portions of a bulb thereof broken away to show internal elements of the bulb, and wherein the filament comprises an arc tube.

In FIG. 2, an arc tube 60 replaces the filament 22, with the remainder of the structures being identical to those of FIG. 1.

As described above, the lamp 10 provides a number of advantages, some of which have been described above and others of which are inherent in the invention. Also, modifications can be proposed to the lamp 10 without departing from the teachings herein. Accordingly, the scope of the invention is only to be limited as necessitated by the accompanying claims.

I claim:

1. An energy saving lamp comprising a cap engaged to a bulb having a glass lens and glass reflector suitably joined together around a filament and emitting cool light, the lens and reflector each having an inner parabolic surface produced by molding under high pressure, the inner surface of the glass lens bearing an IR reflecting $TiO_2$—$SiO_2$ material laver and the inner surface of the glass reflector bearing an IR reflecting material layer, the bulb being of a predetermined configuration to produce a substantial coincidence between a reflective focus from the lens and a reflective focus from the reflector upon the filament along a length thereof.

2. The lamp of claim 1 further including a positioning dimple in the lens aligning the axes of the filament, the lens, and the reflector along a single straight line centered with respect to and extending between the lens and the reflector.

3. The lamp of claim 1 wherein the configuration of elements interior of the bulb are mathematically modeled to cause substantially all IR rays emitted by the filament to be reflected back to the filament.

4. The lamp of claim 3 wherein the filament is linear, having two ends, one of which is mounted at a predetermined focal point, and the other end of which is mounted near a bottom of the reflector, the filament extending along a center axis of the lamp.

5. The lamp of claim 1 being a single end type lamp chosen from the group comprising incandescent, halogen, high pressure sodium, metal halide, and xenon lamps, among others.

6. The lamp of claim 1 being a double end type lamp chosen from the group comprising halogen, high pressure sodium, metal halide, and xenon lamps, among others.

7. The lamp of claim 1 wherein the IR reflecting material coated onto the reflector is $TiO_2$—$SiO_2$.

8. The lamp of claim 1 wherein the IR reflecting material coated onto the reflector is aluminum.

9. The lamp of claim 1 incorporating an arc tube.

10. The lamp of claim 1 wherein the parabolic plane for the reflector is determined from the equation:

$$Y_1^2 = ((r^2)X)/b_1$$

wherein:
r=the radius of the reflector parabolic plane;
X=the axial length of the filament; and
$b_1$=height of the reflector parabolic plain.

11. The lamp according to any one of claims 1 to 5, characterized in that the inner paraboloid surface of the lens is calculated by the equation $$y_2^2 = \frac{r_2^2}{b_2} x_1$$

wherein $Y_2$ is the ordinate of the paraboloid, x is the abscissa of the paraboloid, $r_2$ is the radius of the caliber of the lens and $b_2$ is the height of the lens.

12. The lamp according to any one of claims 1 to 6, characterized in that the inner paraboloid surface of the reflector is calculated by the equation $$y_1^2 = \frac{r_1^2}{b_1} x_1$$

wherein $Y_1$ is the ordinate of the paraboloid, x is the abscissa of the paraboloid, $r_1$ is the radius of the caliber of the reflector and $b_1$ is the height of the reflector.

13. The lamp according claim 6, characterized in that the radius $r_2$ of the caliber of the lens and the radius $r_1$ of the caliber of the reflector are equal.

14. The lamp according to claim 7, characterized in that the height $b_1$ of the reflector is calculated by $$b_1 = \frac{r_1^2}{4f_1}$$

wherein $f_1$ is the focal length of the paraboloid surface of the reflector.

15. The lamp according to any one of claims 6 and 8, characterized in that the height of $b_1$ of the lens is equal to the focal length $f_1$ of the paraboloid surface of the reflector.

16. The lamp according to any one of claims 6 and 9, characterized in that the focal length $f_2$ of the paraboloid surface of the lens is calculated by $$f_2 = \frac{r_2^2}{4b_2}.$$

17. The lamp according to any one of claims 8 through 10, characterized in that the focal length $f_1$ of the paraboloid surface of the reflector is at least the same as the length of the filament or between two emitting electrodes of arc tube.

* * * * *